United States Patent Office.

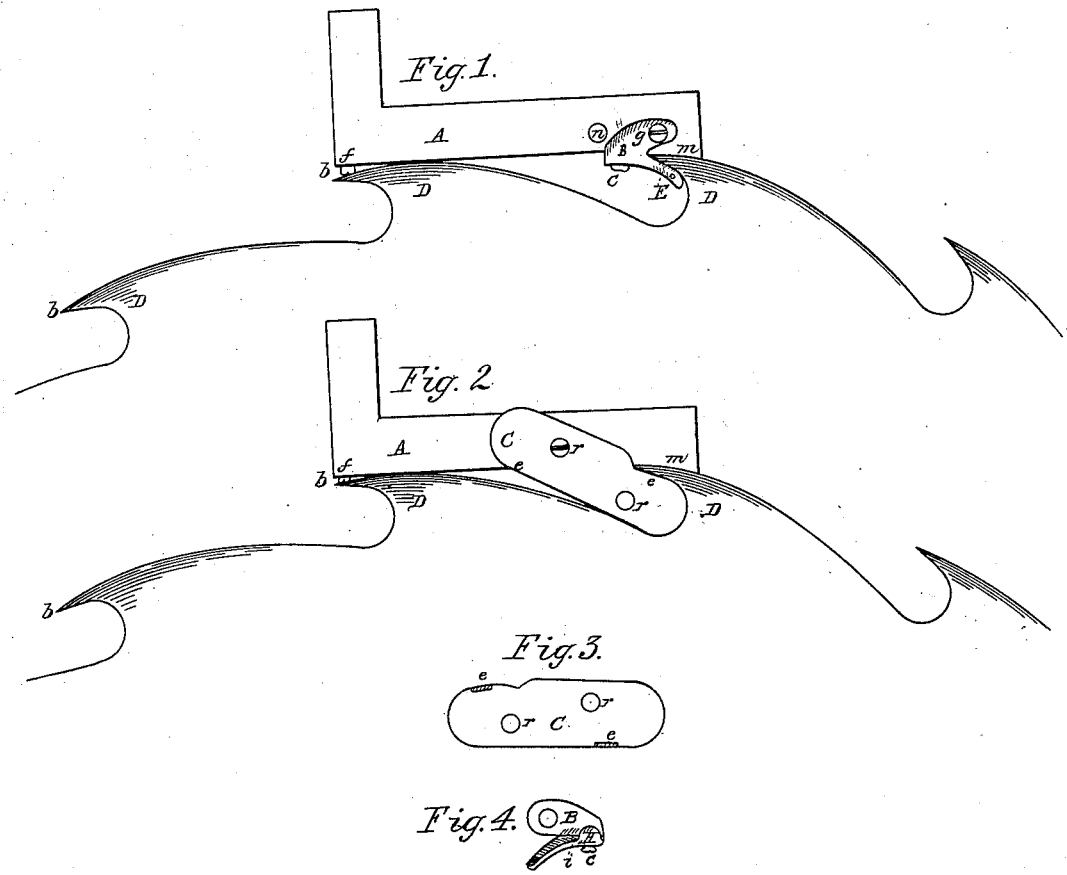

HYMEN CLENDENEN, OF WASHINGTON COUNTY, OHIO.

Letters Patent No. 90,638, dated June 1, 1869.

IMPROVEMENT IN SAW-SET.

The Schedule referred to in these Letters Patent and making part of the same.

*To all whom it may concern:*

Be it known that I, HYMEN CLENDENEN, of the county of Washington, and State of Ohio, have invented a new and improved Rule for Circular Saws, of which the following is a full, clear, and exact description, reference being had to the accompanying drawings, making part of this specification, in which—

Figure 1 is a view of a saw with the rule and gauge attached.

Figure 2 is a view of a saw with the rule and gumming-pattern applied.

Figure 3 is the gumming-board.

Figure 4 is the gauge.

My invention has for its object to provide a means for gauging and regulating the form and thickness of circular-saw teeth.

To enable others skilled in the art to make and use my invention, I will proceed to describe the manner in which I have carried it out.

In the said drawings—

A is a rule slightly curved at one end, $m$, and having a temper-screw at the other.

To it is attached the gauge, fig. 4, by means of the screw, $g$, the rule resting on the bed $i$, between B and H.

The gauge has a screw, $c$, in its bottom, whereby the angle between $o$ and $m$ can be increased or diminished.

In measuring the saw-teeth, the temper-screw $f$ is placed on the point of one tooth, $b$, and the adjoining tooth, E, is fitted into the angle between $o$ and $m$, thus regulating the thickness and shape of each tooth.

The rule is provided with several holes, $n$, in order to lengthen or shorten the distance between the temper-screw $f$ and the gauge B, thus adapting it to any-sized saw.

The gumming-pattern, fig. 3, is made with two shoulders, $e\ e$, to fit against the rule, and is attached to it in the same manner as the gauge B.

The ends are made of different sizes, so as to be adapted to the size of the saw.

In using the rule with the gumming-pattern, the temper-screw $f$ rests on the point of one tooth, and the gumming-board in the gumming of the adjoining one, the point of the tooth fitting in the angle between $e$ and $m$.

What I claim as my invention, and desire to secure by Letters Patent, is—

The rule A, with its temper-screw $f$, in combination with the gumming-board C, with its shoulders $e\ e$, substantially as and for the purpose set forth.

Also, the gauge B, with the screw $c$, in combination with the rule A, with its temper-screw $f$, as and for the purpose set forth.

HYMEN CLENDENEN.

Witnesses:
W. G. TRUESDELL,
JOHN HILL.